United States Patent [19]
Schmidt et al.

[11] Patent Number: 5,891,480
[45] Date of Patent: Apr. 6, 1999

[54] APPARATUS FOR THE CONTINUOUS PRODUCTION OF BIAXIALLY-STRETCHED BLOWN PLASTIC FOIL

[75] Inventors: Claus Peter Schmidt, Hennef; Josef Nowak, Siegburg, both of Germany

[73] Assignee: Reifenhauser GmbH & Co. Maschinenfabrik, Troisdorf, Germany

[21] Appl. No.: 790,148

[22] Filed: Jan. 28, 1997

[30] Foreign Application Priority Data

Feb. 9, 1996 [DE] Germany ................. 196 04 654.8

[51] Int. Cl.⁶ .................................................. B29C 47/90
[52] U.S. Cl. .......................... 425/66; 264/209.5; 264/565; 425/72.1; 425/326.1; 425/392
[58] Field of Search .................. 425/66, 72.1, 326.1, 425/387.1, 392; 264/565, 566, 209.5

[56] References Cited

U.S. PATENT DOCUMENTS 5,756,041  5/1998  Arruda ..................... 425/392

FOREIGN PATENT DOCUMENTS

| | | |
|---|---|---|
| 1 184 936 | 6/1956 | Germany . |
| 15 04 050 | 2/1969 | Germany . |
| 1 629 282 | 3/1972 | Germany . |
| 2158337 | 5/1973 | Germany ............... 425/326.1 |
| 37 29 449 | 3/1989 | Germany . |
| 40-21265 | 9/1965 | Japan ................... 425/72.1 |

*Primary Examiner*—Patrick Ryan
*Assistant Examiner*—Joseph Leyson
*Attorney, Agent, or Firm*—Herbert Dubno

[57] ABSTRACT

A foil-blowing apparatus and start-up method utilizes switchable roller pairs and a seal in an upstream primary tube stretch to subdivide the interior of the primary tube into an upper chamber and a lower chamber, the lower chamber being in communication with a rising stretch of the primary tube with the tube in a heating chamber which brings the extruded tube to a foil-blowing temperature. The foil is blown by the pressure in the lower pressure chamber, at least during start up.

5 Claims, 3 Drawing Sheets

APPARATUS FOR THE CONTINUOUS PRODUCTION OF BIAXIALLY-STRETCHED BLOWN PLASTIC FOIL

FIELD OF THE INVENTION

Our present invention relates to an apparatus for the continuous production of biaxially-stretched webs of synthetic resin material, hereinafter referred to as blown plastic foil. More particularly the invention relates to a foil-blowing apparatus using extruded thermoplastic materials in which stretching in two directions is carried out to strengthen the foil.

BACKGROUND OF THE INVENTION

A foil blowing apparatus can comprise an extruder having an annular-gap nozzle from which a primary tube of the thermoplastic synthetic resin is extruded, this tube having a hose-like character and being relatively pliable. Upon cooling of the extruded plastic tube, integrity is imparted thereto and the plastic tube is flattened in the cooled state so that it remains in a flattened condition until it is supplied to a heating stretch where it is heated to a plastically deformable state, hereinafter referred to as the blowing temperature. At the blowing temperature, the primary tube is expanded into a balloon or bubble to form a longitudinally stretched and circumferentially stretched product which can be referred to as a secondary tube with thinning of the wall to the thickness of a foil. Downstream of the blowing station, a flattening unit is provided to flatten the foil balloon or bubble and the web of blown foil can then be wound up or coiled.

Generally speaking, at the end of the primary tube beneath the annular-gap nozzle and ahead of the heating stretch and at the outlet side of the flattening unit ahead of the foil coiling unit, drawing roller pairs are provided which can apply tension to the tubes to draw the primary tube downwardly until it reaches the first roller pair at the end of the primary tube and at which the primary tube is flattened.

From the primary drawing roller pair, the flattened primary tube can pass upwardly to a second drawing roller pair at the inlet to the heating stretch and the secondary tube is provided below the foil-blowing station to draw the foil tube downwardly with flattening of the foil.

While the first primary tube section is generally vertical and downwardly oriented, it can be inclined downwardly as well.

The next section of the primary tube, already flattened, usually passes at an inclination upwardly to the second drawing roller pair.

An apparatus of this type can be provided in a variety of configurations. The primary tube can have a single layer wall or two or more layers forming the wall thickness. The apparatus can thus be used to produce simple foils or a composite or multilayer or laminate foils. The biaxial stretching is effected by a superimposition of axial stretching in the longitudinal direction of the primary tube with a transverse or circumferential stretching in the blowing of the foil bubble. The axial stretching can be effected by the action of the drawing roller pairs and the stretching resulting from the blowing can be orthogonal to the axial stretching.

The cooling of the primary tube is effected upon emergence of the actuated tube from the annular gap and utilizing air or water.

Difficulties have been encountered with such apparatus with respect to the uniformity and reproducibility of the product and with respect to start up of the apparatus. Indeed, numerous manipulations of the equipment can be required for start up which may need expert intervention. In fact, the primary tube must not only be threaded through the first pair of drawing rollers but the tubes must be fed through the entire system by hand for start up all the way through to the coiling unit. The apparatus must be slowly brought to the blowing operation by the gradual introduction of blowing air into the heated stretch of the primary tube. The start-up process is thus time-consuming until the desired stretching ratio is reached.

OBJECTS OF THE INVENTION

It is, therefore, the principal object of the present invention to provide an improved apparatus of the specific type described so that start up problems can be eliminated and the production of biaxially-stretched blown foil can be made more reliable and less time-consuming.

Still another object of the invention is to provide an apparatus of the type described which simplifies the start-up operation and enables the start up to be effected by the usual operating personnel, eliminating the need for experts and considerable manual intervention.

Still another object of the invention is to facilitate control of the start up of a biaxial stretched foil-blowing apparatus and to eliminate drawbacks of earlier systems.

It is also an object of this invention to provide an improved start-up method which is particularly geared to such an improved apparatus.

SUMMARY OF THE INVENTION

These objects and others which will become apparent hereinafter are attained, in accordance with this invention by providing, in an apparatus of the type described, a blowing pipe which is disposed in the primary tube and extends through the annular-gap nozzle and has in the region of its mouth, a seal which can be actuated between an effective and an ineffective position. The seal, in its effective position, can seal the primary tube and can seal against the inner wall of the primary tube, to partition the primary tube into an upper pressure chamber and a lower pressure chamber. The lower pressure chamber communicates via the first pair of actuatable drawing rollers, the flattened primary tube and the second drawing roller pair with the foil bubble and the secondary tube so that the pressure in the lower chamber is communicated to the region of the foil bubble. Communication is thus effected from the lower chamber of the way through to the third drawing roller pair. The actuatable seal is operable at least for the start up of the apparatus.

More particularly, the foil-blowing apparatus of the invention comprises:

an extruder unit having a annular-gap nozzle for extruding a primary tube downwardly;

a downwardly extending blowing-air pipe extending from the nozzle into the primary tube and formed at a region at which the pipe opens into the primary tube with a seal defining in the tube upper and lower pressure chambers, and means for actuating the seal to displace the seal between a position in which the seal closes communication between the upper and lower pressure chambers and a position in which the seal allows intercommunication between the chambers;

cooling means below the nozzle for cooling the primary tube at least in a region of the lower pressure chamber;

a first drawing roller pair below the lower pressure chamber and engageable with the primary tube and flattening the primary tube while advancing the primary tube from the cooling means, the primary tube traveling downwardly to the first drawing roller pair;

a second drawing roller pair engaging the primary tube and located above the first drawing roller pair, the primary tube traveling upwardly to the second drawing roller pair;

means forming a heating stretch extending downwardly from the second drawing roller pair and traversed downwardly by the primary tube for heating the primary tube to a foil blowing temperature;

means below the heating stretch forming a blowing stretch for the primary tube for blowing a longitudinally and circumferentially stretched secondary tube therefrom;

a third drawing roller pair below the blowing stretch engageable with the secondary tube and flattening the secondary tube, the secondary tube passing downwardly to the third drawing roller path;

foil winding means receiving a blown foil from the third drawing roller pair; and means for enabling communication between the lower chamber and the primary tube in the heating stretch and the secondary tube in the blowing stretch past the first and second drawing roller pairs at least upon startup of the apparatus while the seal closes communication between the upper and lower pressure chambers.

A method of start-up of such an apparatus comprises the steps of:

(a) initially extruding the primary tube from the nozzle, flattening the primary tube and running the flattened primary tube past the rollers and the stretches to the foil winding means;

(b) then closing the third drawing roller pair on the flattened primary tube running to the foil winding means;

(c) next actuating the seal to close communication between the upper and lower pressure chambers;

(d) thereafter blowing air into the lower pressure chamber to generate a pressure of 1 to 4 bar therein;

(e) controlling the first and second drawing roller pairs so that the pressure in the lower pressure chamber is communicated all along the primary tube to the third drawing roller pair;

(f) at least simultaneously with step (e) energizing the heating stretch to heat the primary tube along the stretch to foil blowing temperature, thereby causing expansion of the primary tube in the blowing stretch to form the foil; and (g) thereafter continuing to advance the primary tube to form the secondary tube and the foil.

According to a feature of the invention, the seal which can be actuated between the ineffective state and an effective state, can be an inflatable sealing ring which, in its inflated or expanded condition, engages the inner wall of the primary tube.

The drawing roll pair which is arranged at the inlet of the heating device preferably comprises a cylindrical roll and an annular chamber roll, the annular chamber receiving the flattened primary tube and permitting the flattened primary tube to be sufficiently patent as to allow communication from the lower chamber to the interior of the primary tube within the heating stretch.

The invention is based upon the fact that the start up of an apparatus of the described type can be effected simply and without problem when an upper and lower pressure chamber are separated in the primary tube at least for the start up and the start up is effected, therefore, as an increased pressure in the lower chamber which is communicated through the flattened primary tube to the part of the primary tube within the heating stretch and then to the portion of the primary tube which is between that heating stretch and the third drawing roller pair so that this pressure will automatically expand the primary tube to form the secondary tube upon heating and thereby enable the transition into the normal operating mode. Once the normal operating mode is established, the seal can be deflated and communication permitted between the seal and the wall of the primary tube between the upper and lower pressure chambers.

In other words, in the start up of the invention, the primary tube is extruded, flattened and fed to the coiling unit. The drafting roll pair at the outlet of the blowing region, immediately upstream of the coiling unit and which flattens the blown foil, can then be closed on the tube, the seal can be inflated to close off the lower pressure chamber from the upper chamber and a pressure of one to four bar can be established in the lower chamber (preferably about three bar). The drawing roll pairs are provided so that this pressure is then communicated to the blowing stretch in which the blowing is automatically effected once the heating is sufficient to transform the flattened primary tube into a plastically stretchable foil.

The heating stretch can be turned on simultaneously with communication of the pressure from the lower chamber to the blowing region.

The separation of the first section of the primary tube into an upper pressure chamber and a lower pressure chamber using the inflatable seal and the system for generating an elevated pressure in the lower pressure chamber and hence different pressures in the two pressure chambers can be used during normal operation as well. In normal operation the blowing air is however also, as is customary, supplied through the blowing head.

BRIEF DESCRIPTION OF THE DRAWING

The above and other objects, features, and advantages will become more readily apparent from the following description, reference being made to the accompanying drawing in which.

SPECIFIC DESCRIPTION

Figures 1, 5:
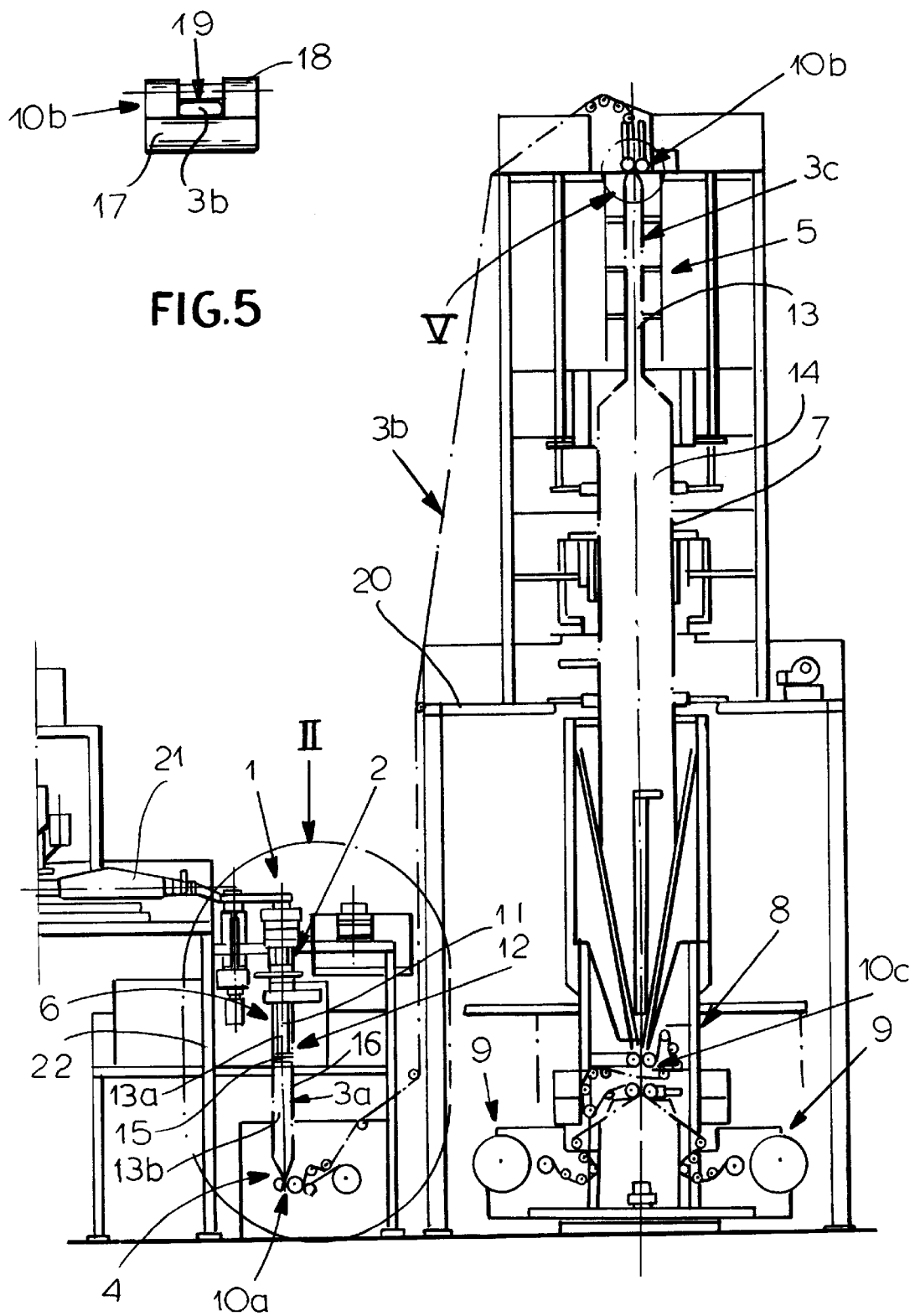
FIG. 1 is a vertical elevational view in highly diagrammatic form of an apparatus for making a blown biaxially-stretched foil in accordance with the invention.
FIG. 5 is a detail of the region V of FIG. 1 showing the annular chamber roller which permits communication of pressure from the lower pressure chamber to the primary tube in the heating stretch.
Figure 2:
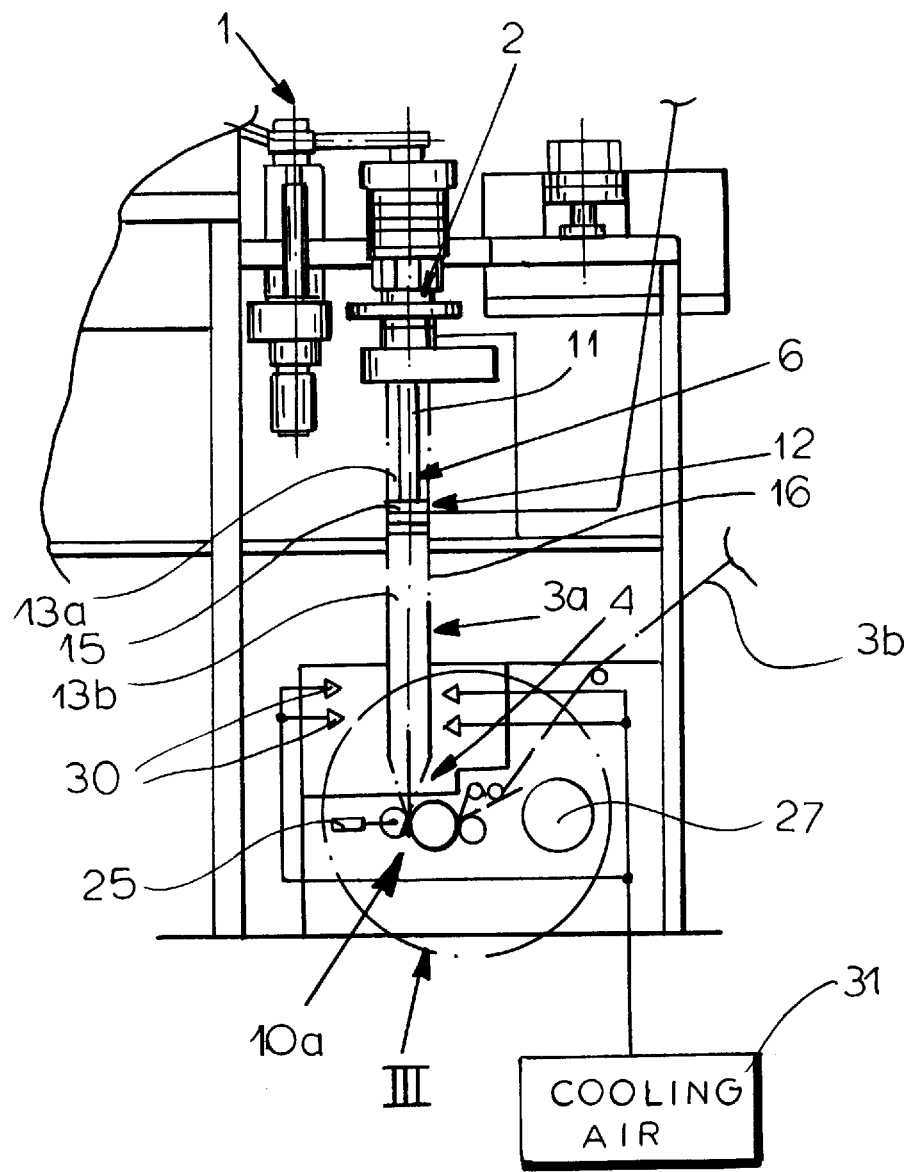
FIG. 2 is a detail, somewhat enlarged to the region II of FIG. 1.

The apparatus shown in the drawing comprises an extruder unit 1 with an annular gap nozzle 2 for the extrusion of a primary tube 3a, 3b, 3c and a device for cooling the primary tube. The primary tube is flattened in the cooled state and fed to a heating stretch 5 where it is heated to the blowing temperature. A device 6 is provided for pressurizing the primary tube which ultimately forms a foil bubble or balloon 6 constituting the secondary tube so that special components for inflating the foil bubble are not required.

The apparatus can comprise a machine frame 20 which can support an extruder 21, the outlet of which is connected with the annular gap nozzle 2 mounted on a frame 22.

The primary tube 3a, 3b, 3c is subdivided into three segments, the first of which is formed by upper and lower pressure chambers 13a, 13b, to be described in greater detail hereinafter. The second section 3b is a partially flattened section which rises, as can be seen in FIG. 1, from the flattening pair of drawing rollers 10a to the pair of drawing rollers 10b at the upper end of the heating stretch 5. The third section of the primary tube is the section 3c within the heating stretch and forming a slender chamber 13 (FIG. 1).

Below the device 6 for blowing the primary tube 3a, 3b, upstream of the heating stretch 5 and at the outlet of a flattening unit 10c upstream of a cooling device 9 for the flattened web, switchable pairs of drawing rollers 10a and 10c are provided. These roller pairs are designed to allow one roller of the pair to be moved closer to or further away from the other roller of the pair in the switching operation. For example, as can be seen in FIG. 3 for the switching roller pair 10a, a roller 24 is displaceable by a hydraulic or pneumatic cylinder 25 toward and away from a stationary roller 26.

When the roller 24 is retracted away from the roller 26, communication is provided between the lower pressure chamber 13b and the primary tube section 3c in the heating region 5 and thus in the foil balloon 7.

Figure 3:
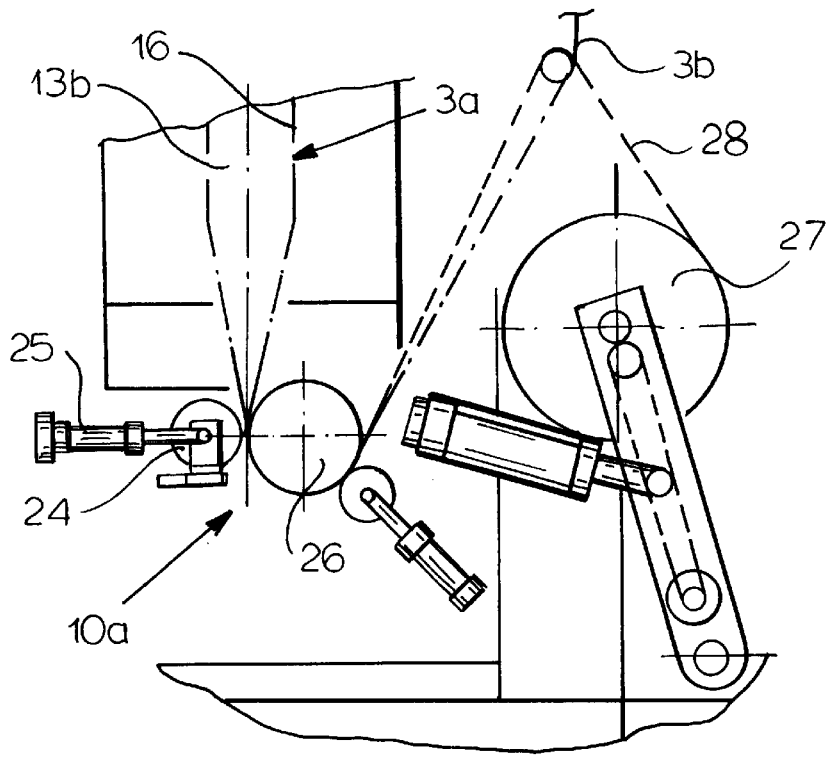
FIG. 3 is a detail of the region III of FIG. 2 drawn with still greater enlargement.

The roller 24 can be pressed fully against the roller 26, however, to block communication of pressure along the primary tube if, for example, the primary tube is to be wound on a coiler 27 as represented by the broken lines 28 in FIG. 3, i.e. the foil-blowing system at 7 being cut out in this case. Otherwise the partially flattened tube passes as represented by the dot-dash line 3b upwardly to the head of the heating stretch 5. The winder 27 can be used when, in the region below the blowing unit 6, the tube is expanded into a foil prior to cooling at 4.

Cooling can be effected at 4 with cooling air blown in through nozzles 30 from a source, e.g. a blower 31, or via some other quenching system.

In accordance with the invention, the primary tube section 3a runs downwardly to the first roller pair 10a and the primary tube is flattened in this first primary tube pair and the flattened primary tube section 3b then rises to the inlet of the heating stretch 5 at which a second drawing tube pair 10b is provided.

In the heating stretch 5, the primary tube section 3c is heated and the blown foil tube bubble 7 is flattened at 8 and supplied via the third roller pair 10c to the coiler 9.

The blowing-air tube 11 extends into the primary tube section 3a and in the region of its mouth has a sealing unit 12 which can be actuated to partition the interior of the tube section 3a into an upper pressure chamber 13a and a lower pressure chamber 13b. The seal 12, when it is switched into its actuated stated, can contact the inner wall 16 of the tube section 3a.

The lower pressure chamber is, at least during start up, in communication via the flattened primary tube section 3b, the roller pairs 10a and 10b and the section 3c in the heating stretch 5 with the interior 14 of the foil bubble up to the third roller pair 10c. The seal 12 is actuatable so that it is in its sealing state at least for start up of the apparatus. It can remain in a sealing state also for normal operation.

Figure 4:
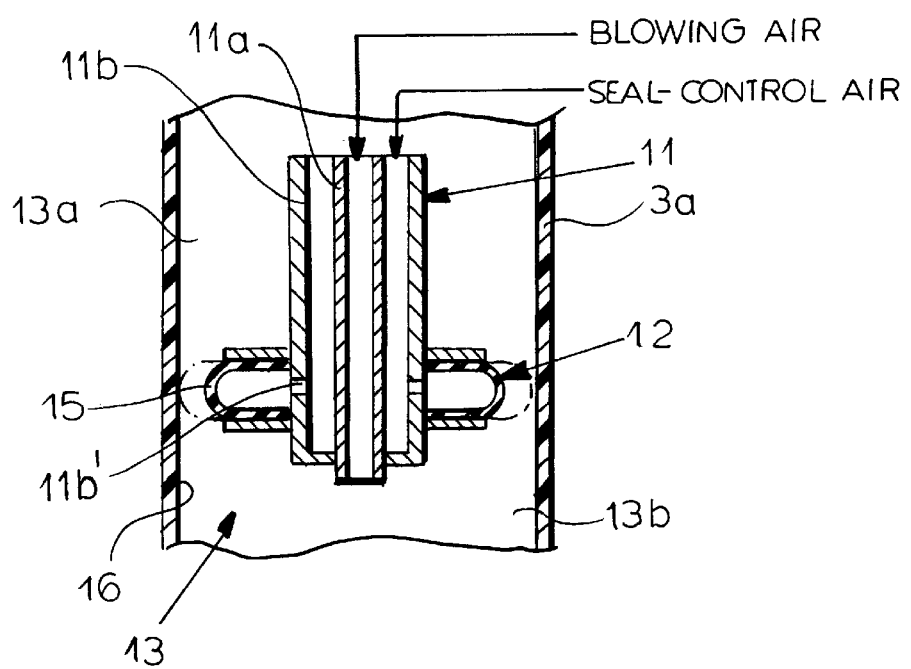
FIG. 4 is a cross sectional view showing the inflatable seal in greater detail.

The sealing unit 12 can comprise an inflatable sealing ring 15 which in its actuated state contacts the inner wall 16 and can be inflated by air supplied between the inner and outer tube members 11a and 11b and radial ports 11b'. The seal control air can be thus separately supplied from the blowing air (see FIG. 4).

As can be seen from FIG. 5, the drawing roll pair 10b which is provided at the inlet to the heating stretch 5 can comprise a cylindrical roll 17 and an annular chamber roll 18, the annular chamber roll 18 accommodating the flattened tube 3b in its chamber 19 to allow communication through the tube 3b with the tube section 3c and the foil bubble.

On start up, therefore, the ring 15b is inflated to engage the wall 16 as the tube 3a, 3b, 3c, etc. is continuously extruded and the tube is threaded through the respective roller pairs to the coiler 9. The roller pair 10c is then actuated to close the end of the extruded tube, the pressure within chamber 13b is built up to one to four bar, heating is switched on at 5 and, when the temperature of the tube reaches the plastic temperature, the bubble 7 automatically forms to thin the wall of the tube and from the biaxially-expanded foil. The speed of rollers 10c can be greater than that of rollers 10b and the speed of rollers 10b can be greater than that of rollers 10a so that the foil is stretched in the axial direction as well as in the circumferential direction upon expansion. After start up in this manner, the seal 15 can be relaxed or left in its expanded state.

We claim:

1. An apparatus for the continuous production of a biaxially stretched synthetic resin blown foil, said apparatus comprising:

an extruder unit having an annular-gap nozzle for extruding a primary tube downwardly;

a downwardly extending blowing-air pipe extending from said nozzle into said primary tube and formed at a region at which said pipe opens into said primary tube with a seal defining in said tube upper and lower pressure chambers, and means for actuating said seal to displace said seal between a position in which said seal closes communication between said upper and lower pressure chambers and a position in which said seal allows intercommunication between said chambers;

cooling means below said nozzle for cooling said primary tube at least in a region of said lower pressure chamber;

a first drawing roller pair below said lower pressure chamber and engageable with said primary tube and flattening said primary tube while advancing said primary tube from said cooling means, said primary tube traveling downwardly to said first drawing roller pair;

a second drawing roller pair engaging said primary tube and located above said first drawing roller pair, said primary tube traveling upwardly to said second drawing roller pair;

means forming a heating stretch extending downwardly from said second drawing roller pair and traversed downwardly by said primary tube for heating said primary tube to a foil blowing temperature;

means below said heating stretch forming a blowing stretch for said primary tube for blowing a longitudinally and circumferentially stretched secondary tube therefrom;

a third drawing roller pair below said blowing stretch engageable with said secondary tube and flattening said secondary tube, said secondary tube passing downwardly to said third drawing roller pair;

foil winding means receiving a blown foil from said third drawing roller pair; and means for enabling communication between said lower chamber and said primary tube in said heating stretch and said secondary tube in said blowing stretch past said first and second drawing roller pairs at least upon startup of the apparatus while said seal closes communication between said upper and lower pressure chambers.

2. The apparatus defined in claim 1 wherein said seal is an inflatable sealing ring which, in an inflated state, lies against an inner wall of said primary tube.

3. The apparatus defined in claim 2 wherein said second drawing roller pair comprises a cylindrical roller and a roller juxtaposed with said cylindrical roller and having an annular chamber through which said primary tube passes.

4. The apparatus defined in claim 3 wherein said first drawing roller pair comprises a fixed roller and a movable roller provided with means for moving said movable roller toward and away from said fixed roller.

5. The apparatus defined in claim 1 wherein said second drawing roller pair comprises a cylindrical roller and a roller juxtaposed with said cylindrical roller and having an annular chamber through which said primary tube passes.

* * * * *